(12) United States Patent
Tanaka

(10) Patent No.: US 8,566,064 B2
(45) Date of Patent: Oct. 22, 2013

(54) ESTIMATING POLYNOMIAL GENERATING DEVICE, ESTIMATING DEVICE, ESTIMATING POLYNOMIAL GENERATING METHOD, AND ESTIMATING METHOD

(75) Inventor: Masato Tanaka, Tokyo (JP)

(73) Assignee: Azbil Corporation, Tokyo (JP)

( * ) Notice: Subject to any disclaimer, the term of this patent is extended or adjusted under 35 U.S.C. 154(b) by 256 days.

(21) Appl. No.: 13/019,492

(22) Filed: Feb. 2, 2011

(65) Prior Publication Data

US 2011/0196652 A1    Aug. 11, 2011

(30) Foreign Application Priority Data

Feb. 8, 2010    (JP) .................................. 2010-025149

(51) Int. Cl.
*G06F 17/18*    (2006.01)

(52) U.S. Cl.
USPC ........................................................ 702/179

(58) Field of Classification Search
USPC ................................................ 702/189, 179
See application file for complete search history.

(56) References Cited

U.S. PATENT DOCUMENTS

| | | | | |
|---|---|---|---|---|
| 7,881,893 | B2 * | 2/2011 | Montemont | 702/85 |
| 8,069,014 | B2 * | 11/2011 | Gopalan | 702/183 |
| 2005/0273739 | A1 * | 12/2005 | Tohyama | 716/4 |

FOREIGN PATENT DOCUMENTS

| | | |
|---|---|---|
| JP | 2-228763 A | 9/1990 |
| JP | 5-141999 A | 6/1993 |

OTHER PUBLICATIONS

Japanese Office Action dated Jun. 13, 2013, which issued during the prosecution of Japanese Patent Application No. 2010-025149, which corresponds to the present application.

* cited by examiner

*Primary Examiner* — Marc Armand
*Assistant Examiner* — Ricky Ngon
(74) *Attorney, Agent, or Firm* — Troutman Sanders LLP

(57) ABSTRACT

An estimating polynomial generating device, comprising: an analysis data storing portion for storing analysis data comprising combinations of input parameter data and output parameter data; a function surface storing portion for storing an equation for a function surface that limits the relationship between an input parameter and an output parameter after homothetic conversion; a homothetic conversion equation storing portion for storing homothetic conversion equations for performing homothetic conversion on the input parameter and the output parameter; a homothetic conversion parameter searching portion for searching for and establishing factors for the homothetic conversion equations using the analysis data, the equation for the function surface, and the homothetic conversion equations; and an estimating polynomial calculating portion for calculating an estimating polynomial, for estimating an output parameter value from an input parameter value, by combining the equation for the function surface and the homothetic conversion equations wherein the factors have been established.

10 Claims, 10 Drawing Sheets

_US 8,566,064 B2_

ESTIMATING POLYNOMIAL GENERATING DEVICE, ESTIMATING DEVICE, ESTIMATING POLYNOMIAL GENERATING METHOD, AND ESTIMATING METHOD

CROSS REFERENCE TO RELATED APPLICATIONS

The present application claims priority under 35 U.S.C. §119 to Japanese Patent Application No. 2010-025149, filed Feb. 8, 2010, which is incorporated herein by reference.

FIELD OF TECHNOLOGY

The present invention relates to an estimating polynomial generating device for calculating an estimating polynomial for estimating an output parameter value, such as a state quantity, and relates to an estimating device for estimating a state quantity, or the like, using an estimating polynomial.

BACKGROUND OF THE INVENTION

In thermal processes and plasma processes in semiconductor manufacturing equipment, flat panel display (FPD) manufacturing equipment, or solar cell manufacturing equipment, there is the need to control important state quantities, such as the surface temperature of a wafer or a glass panel (the temperature of the actual object), or the like, online during the execution of the process. However, it is difficult to perform a process with a temperature sensor attached to the surface of the wafer or the glass panel.

Given this, the critical state quantities are controlled online through first investigating, off-line, the relationship between a temperature in a location that can be measured during the execution of the process and the surface temperature of a wafer or a glass panel (the temperature of the actual object) that cannot be measured during the execution of the process, and then to estimate the surface temperature of the wafer or glass (the temperature of the actual object) based on the relationship, understood in advance, to the temperature that can be measured during the execution of the process. In such a case, methods for calculating polynomials that linearly approximate the numerical relationships between the measurable temperature and the surface temperature of the wafer or the glass panel (and estimations of state quantities using polynomials) are widely performed through the application of multivariate analysis methods to measurement data (analysis data) for the temperatures that can be measured and the surface temperatures of the wafers or the glass panels (the temperatures of the actual objects), obtained off-line. (See, for example, Japanese Unexamined Patent Application Publication H5-141999.) When multivariate analysis methods are used, the temperature that can be measured during the execution of the process is positioned as an input parameter in the polynomial. On the other hand, the surface temperature of the wafer or the glass panel (the temperature of the actual object), which is the subject of the estimation, is positioned as the output parameter of the polynomial.

In many cases, that which is subject to state quantity estimation does not have a simple linear relationship between the input parameter and the output parameter. Consequently, if one wishes to improve the accuracy of the state quantity estimation then it is necessary to increase the order of the estimating polynomial that is calculated through the multivariate analysis. At this time, unless the input parameter is varied experimentally, there will be a scarcity of data in the parameter space on the input parameter side of the analysis data. When increasing the order of the estimating polynomial there is a tendency for the accuracy to increase in the region wherein the data are dense, but in region wherein data are scarce, there is a high probability that the resulting polynomial will calculate unrealistic estimated values. In particular, when estimating functions are built into equipment such as semiconductor manufacturing equipment and the equipment manufacturers ship the equipment to the equipment users, and the equipment users gather analysis data, the input parameter space envisioned by the equipment manufacturer side will not necessarily match the input parameter space as understood by the equipment user side. Consequently, regardless of the fact that that this problem with density/scarcity of the collection of analysis data tends to occur when this type of equipment is distributed, this problem tends to be overlooked.

In order to simplify the explanation, let us assume that there is a single input parameter. Let us assume that six combinations of values A through F have been obtained as analysis data with the (X, Y) combinations, of the input parameter X and the output parameter Y as follows: A (1.6, 20.024), B (2.0, 21.000), C (2.4, 23.304), D (2.8, 27.272), E (3.2, 33.288), and F (3.5, 39.375). At this time the distribution of the analysis data in the six combinations of A through F is as illustrated in FIG. 12.

While this is a distinctive feature of the analysis data at this time, let us assume that, in consideration of the physical relationship between the input/output parameters (X, Y) that intuitively one can expect there to be a monotonically increasing relationship. That is, one can assume that, by prior knowledge, one can envision the relationships between the input and output parameters (X, Y) to be as in FIG. 13. Even when there is such a relationship, situations wherein data cannot be obtained in the vicinity of X=0, that is, wherein there is a region of data scarcity due to circumstances on the equipment user side, such as an awareness of data collection, frequently occurs in workplaces such as in semiconductor manufacturing. When the combinations of the A through F data are used in, for example, multivariate analysis for a third-order polynomial in order to achieve high accuracy in reproducing the relationship of the input/output parameters (X, Y), then an equation such as the following will be produced:

$$Y = X^3 - 2.0X^2 + 21.0 \qquad (1)$$

The third-order curve 220 illustrated in FIG. 14 is obtained from the third-order polynomial of Equation (1). On the other hand, 221 is a curve that illustrates the relationship between the input and output parameters (X, Y) obtained from common-sense assumptions such as described above. As illustrated in FIG. 14, the third-order polynomial of Equation (1) matches the data A through F with high accuracy. On the other hand, according to this third-order polynomial, at the point in the vicinity of X=0, S (0.0, 21.000) will result. That is, there are data-scarce regions everywhere other than the data-dense region of 1.6≤x≤3.5 in the parameter space of the input parameter X, and in these data-scarce regions the third-order polynomial of Equation (1) is a polynomial that produces unrealistic estimated values.

If this situation wherein unrealistic estimated values are calculated by the estimating polynomial in this way is overlooked, for example, if temperatures are estimated online in a semiconductor manufacturing process, then there will be a region wherein one can expect highly accurate estimates (the data-dense region), and regions wherein unrealistic estimates will be made (the data-scarce regions). Given this, there has been the possibility that there can be a large deleterious impact on the manufacturing process in the regions wherein unrealistic temperature estimates are made.

The present invention was created in order to solve the problem set forth above, and the object thereof is to provide an estimating polynomial generating device, an estimating device, an estimating polynomial generating method, and an estimating method able to calculate an estimating polynomial that enables a reduction in the probability of the calculation of an unrealistic estimated value in a region wherein the analysis data are scarce, when performing estimates of, for example, state quantities using an estimating polynomial, wherein the estimating polynomial was calculated using the analysis data.

SUMMARY OF THE INVENTION

The estimating polynomial generating device according to the present invention includes analysis data storing means for storing in advance analysis data comprising input parameter data and corresponding output parameter data; function surface storing means for storing in advance an equation for a function surface for limiting the relationship between the input parameter and the output parameter after a homothetic conversion; homothetic conversion equation storing means for storing in advance a homothetic conversion equation for performing homothetic conversion of the input parameter and the output parameter; homothetic conversion parameter searching means for searching and establishing factors of the homothetic conversion equation using the analysis data, the equation for the function surface, and the homothetic conversion equation; and estimating polynomial calculating means for calculating an estimating polynomial for estimating an output parameter value from an input parameter value by combining the function surface equation and the homothetic conversion equation for which the factors have been established.

Additionally, the estimating polynomial generating device according to the present invention comprises: analysis data storing means for storing in advance analysis data comprising input parameter data and corresponding output parameter data; function surface storing means for storing in advance an equation for a function surface for limiting the relationship between the input parameter and the output parameter after a homothetic conversion; homothetic conversion equation storing means for storing in advance a homothetic conversion equation for performing homothetic conversion of the input parameter and the output parameter; analysis data count checking means for evaluating whether or not there is a region wherein the analysis data are scarce; homothetic conversion parameter searching means for searching and establishing factors of the homothetic conversion equation using the analysis data, the equation for the function surface, and the homothetic conversion equation when there is an evaluation that there is a region wherein the analysis data are scarce; estimating polynomial calculating means for calculating an estimating polynomial for estimating an output parameter value from an input parameter value by combining the function surface equation and the homothetic conversion equation for which the factors have been established, when there is an evaluation that there is a region wherein the analysis data are scarce; multivariate analysis performing means for calculating an estimating polynomial for estimating an output parameter value from an input parameter value through multivariate analysis on the analysis data when there is an evaluation that there is no region wherein the analysis data are scarce; and function surface updating means for updating the equation for the function surface, stored in the function surface storing means, as an equation for a function surface with a new estimating polynomial calculated by the multivariate analysis performing means.

Additionally, in an example configuration of an estimating polynomial generating device according to the present invention, the homothetic conversion parameter searching means use a searching equation wherein the homothetic conversion equations are substituted into the equation for the function surface to search for factors in the homothetic conversion equations that minimize the sum of the errors obtained for each of the analysis data by calculating, for each analysis datum, the error in the output parameter calculated by substituting the analysis data into the searching equation. Moreover, in the example configuration of the estimating polynomial generating device, the analysis data count checking means divide the input parameter space into a plurality of sub-regions, and if there are analysis data of at least a specified count in all of the sub-regions or in sub-regions of at least a proportion that is set in advance, the evaluation is that there are no regions wherein the analysis data are scarce.

Additionally, the estimating device includes input parameter value acquiring means for acquiring an input parameter value; and polynomial estimate calculating means for estimating an output parameter from an input parameter, acquired by the input parameter value acquiring means, using an estimating polynomial calculated by the estimating polynomial calculating means of the estimating polynomial generating device. Additionally, the estimating device has input parameter value acquiring means for acquiring an input parameter value; and polynomial estimate calculating means for estimating an output parameter from an input parameter, acquired by the input parameter value acquiring means, using an estimating polynomial calculated by the estimating polynomial calculating means or the multivariate analysis performing means of the estimating polynomial generating device. Additionally, the estimating device according to the present invention includes input parameter value acquiring means for acquiring an input parameter value; and homothetic conversion calculating means for calculating a parameter value wherein there has been a homothetic conversion of an input parameter value acquired by the input parameter value acquiring means, using a homothetic conversion equation wherein factors are established by the homothetic conversion parameter searching means of the estimating polynomial generating device; a provisional estimated value calculating portion for estimating a provisional output parameter value homothetically converted from an input parameter value, homothetically converted by the homothetic conversion calculating means, using an equation for a function surface stored in the function surface storing means of the estimating polynomial generating device; and inverse-homothetic conversion calculating means for calculating a final output parameter value from the provisional output parameter value calculated by the provisional estimated value calculating means, through an inverse calculation of the homothetic conversion equation having factors established by the homothetic conversion parameter searching means of the estimating polynomial generating device.

Additionally, the estimating polynomial generating method includes a homothetic conversion parameter searching step for acquiring, from analysis data storing means for storing in advance analysis data comprising input parameter data and corresponding output parameter data, from function surface storing means for storing in advance an equation for a function surface for limiting the relationship between the input parameter and the output parameter after a homothetic conversion, and from the homothetic conversion equation storing means for storing, in advance, a homothetic conversion equation for homothetically converting an input parameter and an output parameter, the analysis data, the equation for the function surface, and the homothetically version equation, and for searching for and establishing factors for the homothetic conversion equation; and an estimating polynomial calculating step for calculating an estimating polynomial for estimating an output parameter value from an input parameter value by combining the function surface equation and the homothetic conversion equation for which the factors have been established.

Additionally, the estimating polynomial generating method according to the present invention has an analysis data count checking step for acquiring the analysis data from the analysis data storing means for storing in advance analysis data comprising input parameter data and corresponding output parameter data, and for evaluating whether or not there is a region wherein the analysis data are scarce; a homothetic conversion parameter searching step for acquiring, from analysis data storing means, from function surface storing means for storing in advance an equation for a function surface for limiting the relationship between the input parameter and the output parameter after a homothetic conversion, and from the homothetic conversion equation storing means for storing, in advance, a homothetic conversion equation for homothetically converting an input parameter and an output parameter, the analysis data, the equation for the function surface, and the homothetically version equation, and for searching for and establishing factors for the homothetic conversion equation, when it has been evaluated that there is a region wherein the analysis data are scarce; and an estimating polynomial calculating step for calculating an estimating polynomial for estimating an output parameter value from an input parameter value by combining the function surface equation and the homothetic conversion equation for which the factors have been established, when there is an evaluation that there is a region wherein the analysis data are scarce; a multivariate analysis performing step for calculating an estimating polynomial for estimating an output parameter value from an input parameter value through multivariate analysis on the analysis data when there is an evaluation that there is no region wherein the analysis data are scarce; and a function surface updating step for updating the equation for the function surface, stored in the function surface storing means, as an equation for a function surface with a new estimating polynomial calculated by the multivariate analysis performing step.

The present invention enables the calculation of an estimating polynomial so as to enable a decrease in the probability of the calculation of an unrealistic estimated value in a region wherein the analysis data are scarce through specifying in advance an equation for a function surface that limits the relationship between the input parameter and the output parameter after a homothetic conversion so that the estimating polynomial obtained from the analysis data, the equation for the function surface, and the homothetic conversion equation will be limited by the function surface.

Additionally, an evaluation is made as to whether or not there is a region wherein the analysis data are scarce, and if the evaluation is that there is a region wherein the analysis data are scarce, then the estimating polynomial is calculated from the analysis data, the equation for the function surface, and the homothetic conversion equations, where if the evaluation is that there is no region wherein the analysis data are scarce, then the estimating polynomial is calculated through ordinary multivariate analysis, thus enabling the calculation of an appropriate estimating polynomial depending on the scarcity/density of the analysis data, and enabling the estimating polynomial calculated when the analysis data are dense to be used to update, as appropriate, the equation for the function surface.

DETAILED DESCRIPTION OF THE INVENTION

The reason why the estimating polynomial calculates an unrealistic estimated value in a region wherein the analysis data are scarce is due to an uncontrolled state wherein the function surface (or the function curve in a case wherein there is only a single input parameter) that is obtained through the estimating polynomial through increasing the order of the estimating polynomial in an attempt to increase the estimate accuracy in the region wherein the analysis data are dense can deform into unanticipated shapes. On the other hand, if the estimates in a region wherein the analysis data are scarce were forced to be realistic, then this would be done at the expense of a loss in the estimating accuracy in the region wherein the estimating data are dense, so a practical constraint should be placed on the shape of the function surface. For example, in the data distribution illustrated in FIG. 12, the equipment manufacturer side should limit in advance to only a homothetic shape of the function surface below:

$$y=4.00x^3-7.92x^2+10.8x+0.22 (\text{wherein } a-1.0 \le x \le 2.5) \qquad (2)$$

Figure 1:
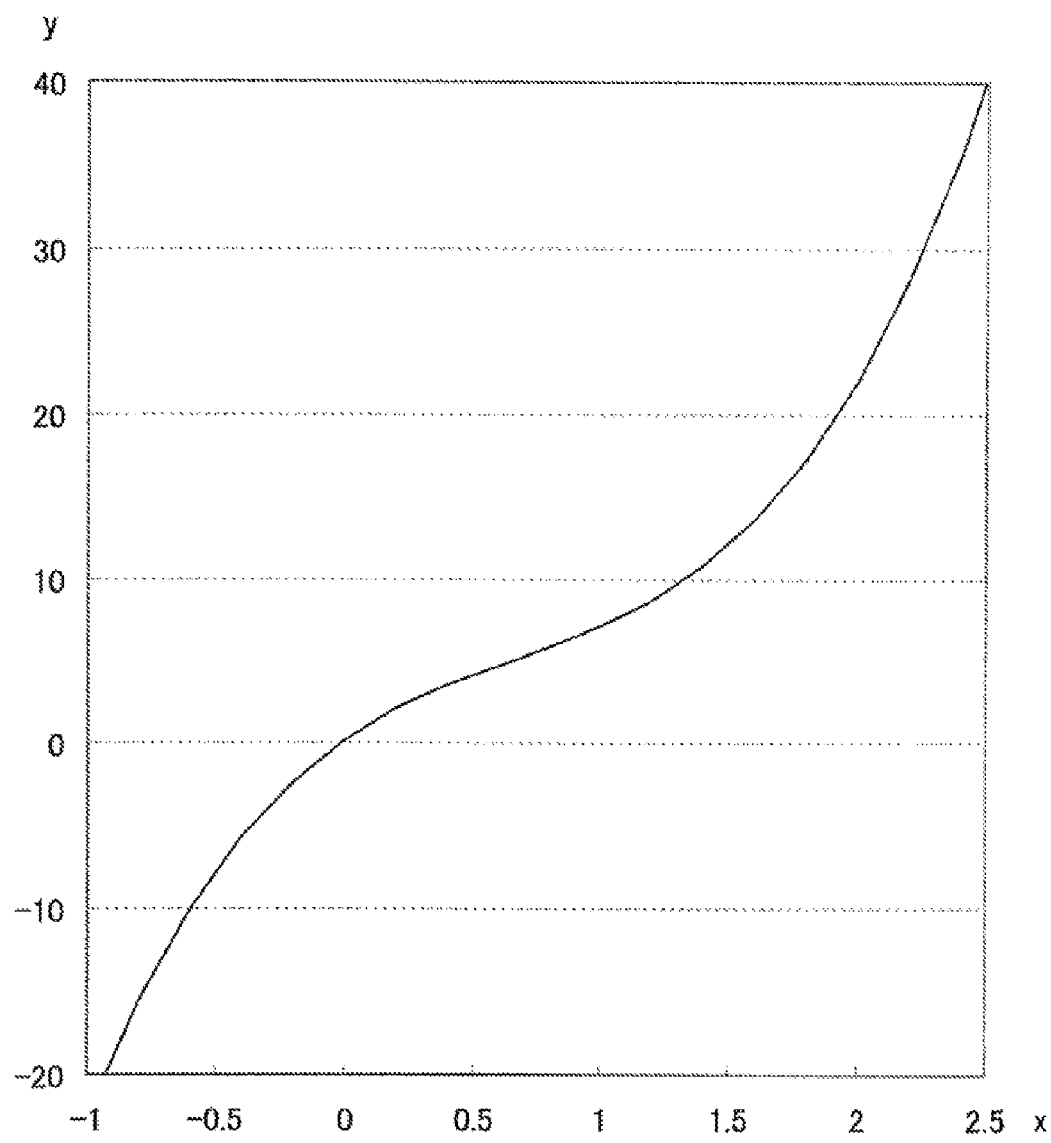
FIG. 1 is a diagram illustrating an example of a function surface given in advance.

The function surface (function curve) obtained from Equation (2) is illustrated in FIG. 1. Note that even though these types of pre-existing constraints do not apply to all of the input/output conditions, given the nature of ordinary equipment, those to which such constraints apply are not uncommon. For example, in a plasma treatment process or a thermal treatment process, there is no doubt that the processing is performed with a particular physical law dominating, even if the physical law is not perfectly understood, and there are no extremely peculiar transitions in the input/output relationships such as, for example, a reversal of the increasing/decreasing relationship between the input and output. This is the reason why, in most cases, the effects that are dependent on the environment wherein the user installs the equipment, and the changes in characteristics accompanying minor modifications to the equipment, require work on the user side to calculate the estimating polynomial.

Additionally, the inventor discovered that it is possible to prevent a large deviation from the expectation on the equipment manufacturer side by performing a homothetic conversion such as in the equations of below (a conversion wherein there is scaling and parallel translation using a first-order equation) on the function surface to search for factors that match the analysis data, to attempt to derive the estimating polynomial:

$$x = aX + b \quad (3)$$

$$y = cY + d \quad (4)$$

The parameter values subject to searching are the factors a, b, c, and d, wherein the searching method may be that which is commonly performed, such as the simplex method. As a result, in the present invention it is possible to calculate the estimating polynomial so as to enable a decrease in the probability of calculation of an unrealistic estimated value in a region wherein the analysis data are scarce.

Figure 12:
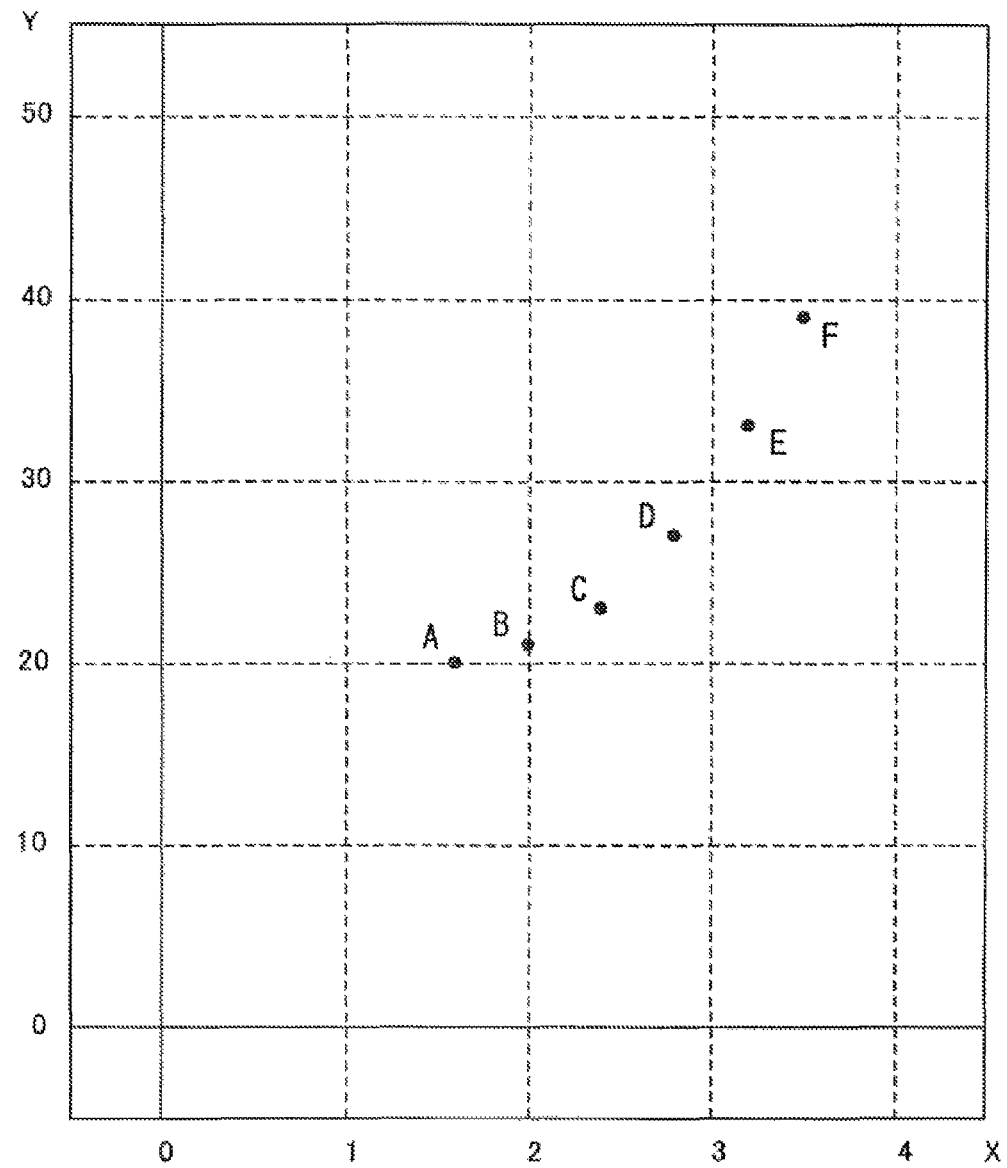
FIG. 12 is a diagram illustrating an example of a distribution of analysis data.
Figure 13:
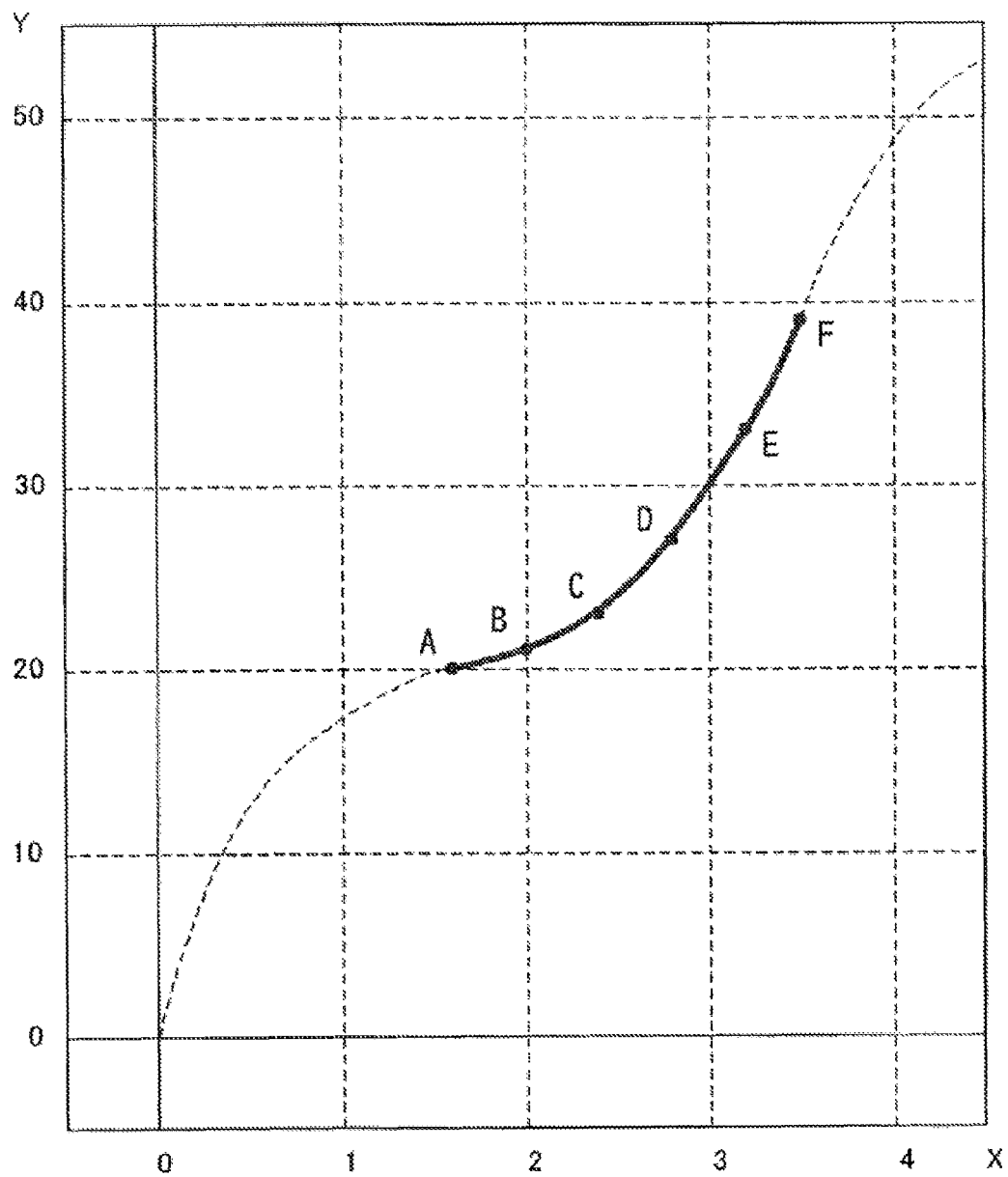
FIG. 13 is a diagram illustrating a relationship between the input and output parameters of the analysis data of FIG. 12, obtained through common-sense assumptions.
Figure 14:
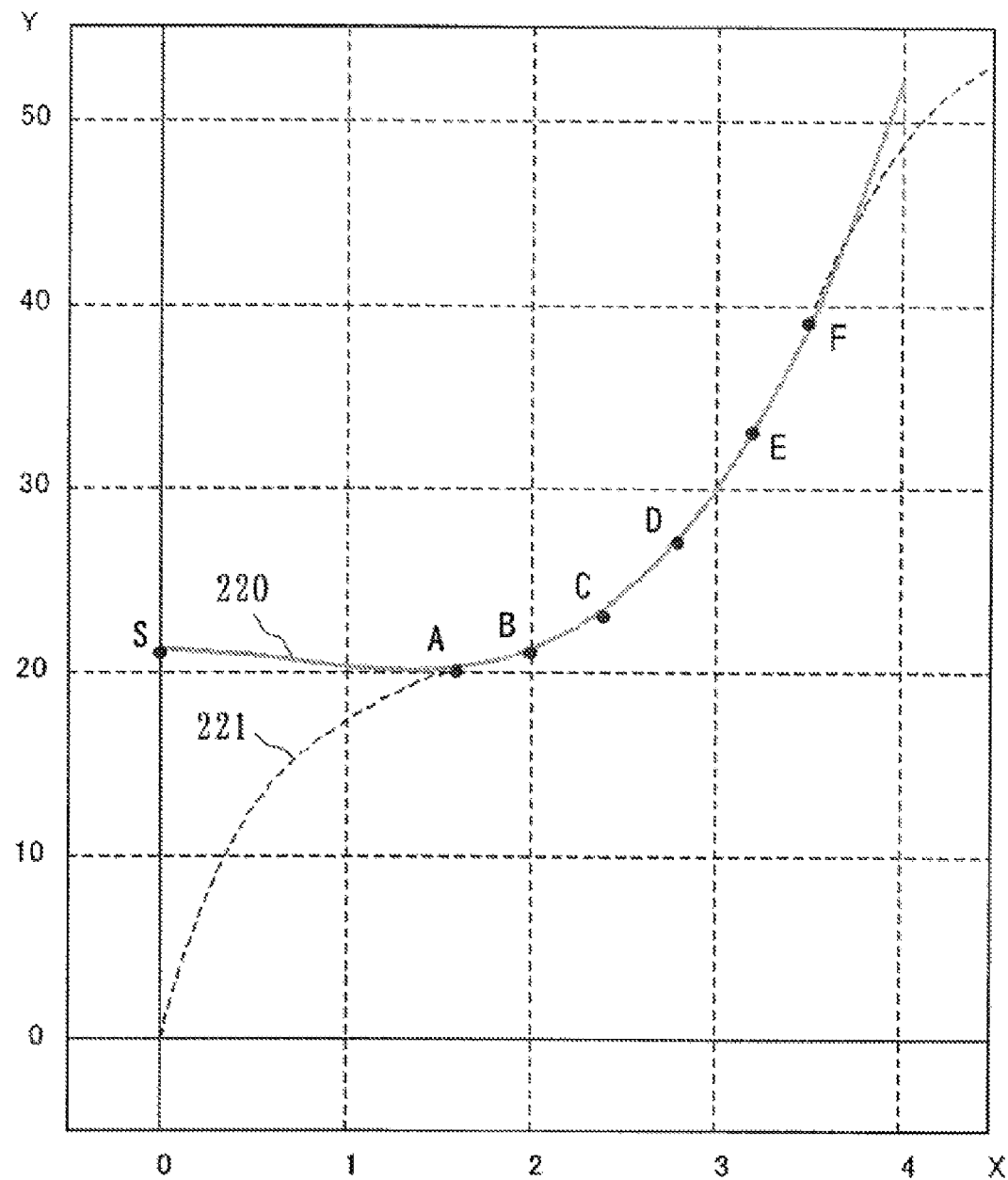
FIG. 14 is a diagram illustrating a relationship between the input and output parameters of the analysis data from FIG. 12, obtained through a third-order polynomial, calculated through multivariate analysis.

For example, the following homothetic conversion equations are obtained when searching for the factors a, b, c, and d in the data distribution illustrated in FIG. 12:

$$x = 0.80X - 0.80 \quad (5)$$

$$y = 0.97Y - 15.56 \quad (6)$$

The following third-order estimating polynomial is obtained when factors are calculated from Equation (2), Equation (5), and Equation (6) to reproduce the relationships between the input and output parameters (X, Y):

$$Y = 2.11X^3 - 11.55X^2 + 25.65X + 0.02 \quad (7)$$

Figure 2:
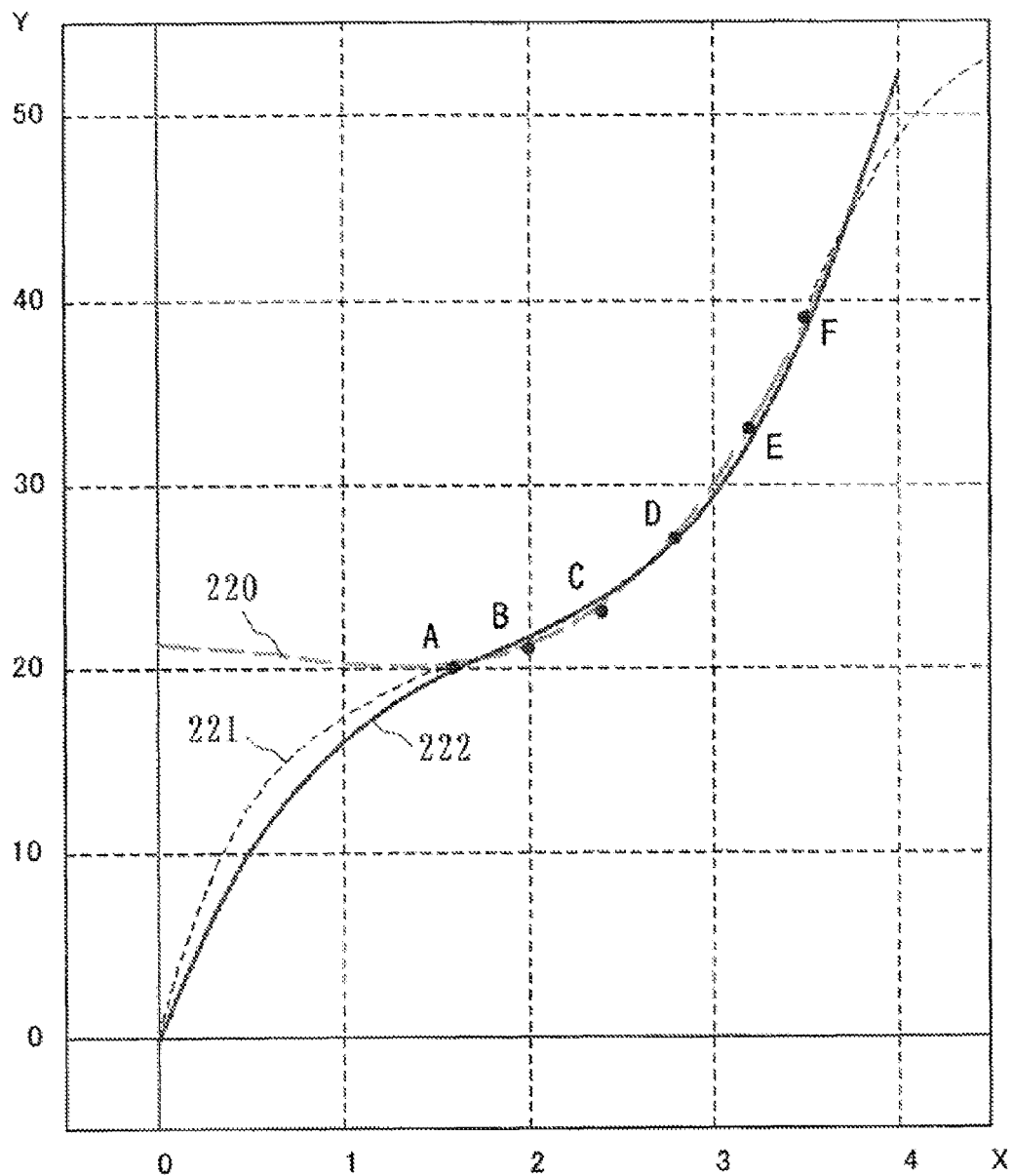
FIG. 2 is a diagram illustrating the relationship between the input and output parameters of the analysis data, obtained from a third-order polynomial obtained through a homothetic conversion.

The third-order curve 222 illustrated in FIG. 2 is obtained from the third-order polynomial in Equation (7). The third-order curve 220 is obtained from the third-order polynomial in Equation (1), and 221 is a curve illustrating the relationship between the input and output parameters (X, Y) obtained from the common-sense assumptions. According to the third-order curve 222, the estimated values in the region wherein the analysis data are scarce can be seen to improve towards the common-sense values from the unrealistic values on the third-order curve 220. Note that even when the number of input parameters is two or more, still the homothetic conversion (a first-order conversion of scaling and parallel translation) may be performed similarly for the individual input parameters.

When the equipment is actually shipped from the equipment manufacturer to the equipment user, the equipment user does not necessarily calculate the estimating polynomial using inadequate data. That is, when there are no data-scarce regions in the input parameter space of the analysis data, preferably the estimating polynomial should be calculated without constraints on the function surface applied in advance by the equipment manufacturer.

Given this, the input parameter space for the analysis data is divided into an appropriate number of sub-regions, and the estimating polynomial is calculated using normal multivariate analysis (multiple regression or the support vector regression (SVR) method, or the like) when it has been confirmed that data of at least a quantity that has been specified in advance exists in all of the sub-regions or in at least a proportion of the sub-regions that has been specified in advance, and the search using homothetic conversion, as described above, is performed when it has been confirmed that data of at least the specified quantity does not exist in some of the sub-regions. At this time, the most recently calculated estimating polynomial is updated as the function surface if it has been confirmed that data of at least the quantity that was specified in advance exists in all of the sub-regions or in at least the proportion of the sub-regions that was specified in advance.

An example is explained below in reference to the drawings.

Figure 3:
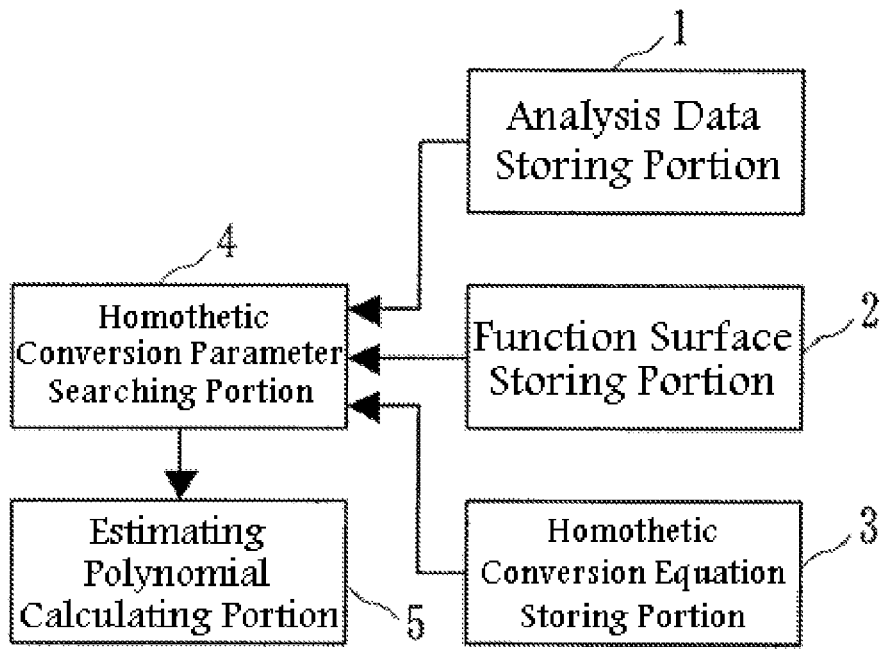
FIG. 3 is a block diagram illustrating a structure for an estimating polynomial generating device according to a an example.

FIG. 3 is a block diagram illustrating a configuration of an estimating polynomial generating device according to an example of the present invention. The estimating polynomial generating device in FIG. 3 has: an analysis data storing portion 1, a function surface storing portion 2, a homothetic conversion equation storing portion 3, a homothetic conversion parameter searching portion 4, and an estimating polynomial calculating portion 5. The present example corresponds to the principle described above.

Figure 4:
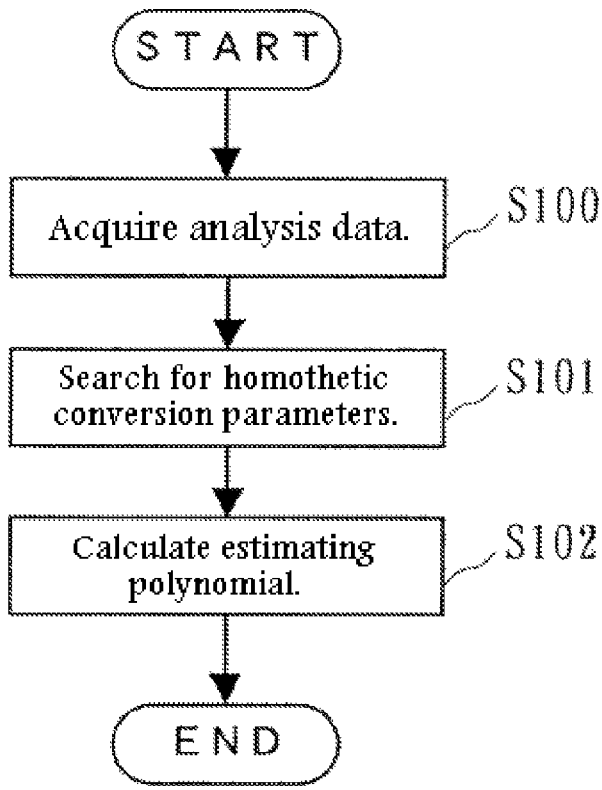
FIG. 4 is a flowchart illustrating the operation of the estimating polynomial generating device according to the present invention.

The operation of the estimating polynomial generating device is explained in reference to the flow chart in FIG. 4. The analysis data storing portion 1 stores, in advance, analysis data comprising combinations of input parameter data and corresponding output parameter data. Examples of input parameter data include temperatures that can be measured during the execution of a process such as a thermal process or a plasma process in semiconductor manufacturing equipment. Examples of output parameters include surface temperatures of wafers or glass panels (temperatures of the actual objects) that cannot be measured during the execution of the process. The analysis data can be obtained in advance through off-line studies performed prior to the processing.

The function surface storing portion 2 stores, in advance, an equation for a function surface that limits the relationship between the input parameter and the output parameter after homothetic conversion. The homothetic conversion equation storing portion 3 stores, in advance, homothetic conversion equations for performing homothetic conversions on the input parameters and the output parameters. These homothetic conversion equations are first-order equations that perform scalings and parallel translations on the input parameters and the output parameters.

The homothetic conversion parameter searching portion 4 obtains analysis data from the analysis data storing portion 1 (Step S100 in FIG. 4) and uses these analysis data, the equation for the function surface stored in the function surface storing portion 2, and the homothetic conversion equations stored in the homothetic conversion equation storing portion 3 to search for the factors of the homothetic equation through a searching method such as the simplex method (Step S101). Specifically, the homothetic conversion parameter searching portion 4 searches for the factors for the homothetic conversion equations through substituting the analysis data into the equation wherein the homothetic conversion equations have been substituted for the x and y in the equation for the function surface.

Here let us assume that six sets of values A through F have been stored in advance in the analysis data storing portion 1 as analysis data for combinations of (X, Y) of the input parameter X and the output parameter Y as A (1.6, 20.024), B (2.0, 21.000), C (2.4, 23.304), D (2.8, 27.272), E (3.2, 33.288), and F (3.5, 39.375). Additionally, let us assume that Equation (2) has been stored in advance as the equation for the function surface in the function surface storing portion 2, and Equation (3) and Equation (4) have been stored in advance as the homothetic conversion equations in the homothetic conversion equation storing portion 3. At this time, the equation wherein the homothetic conversion equations have been substituted into the equation for the function surface will be as follows:

$$Y(X)=\{4.00(aX+b)^3-7.92(aX+b)^2+10.8(aX+b)+0.22-d\}/c \text{(where } -1.0 \leq aX+b \leq 2.5) \quad (8)$$

Given this, the homothetic conversion parameter searching portion 4 searches for the factors a, b, c, and d of the homothetic conversion equation so as to minimize the sum $$\Sigma |Y-Y(X)|$$

wherein is summed the differences calculated for each of the individual analysis data A through F, by calculating the difference, for each of the analysis data A through F, between the output parameter data Y in the analysis data and the output parameter Y (X) that is calculated by substituting the analysis datum into Equation (8), that difference being |Y−Y (X)|. Note that cases wherein there would be a, b that exist outside of −1.0≤(aX+b)≤2.5 are excluded by the constraint in Equation (8). The factors in the homothetic conversion equation of a=0.80, b=−0.80, c=0.97, and d=−15.56 are obtained as the result of the search.

The estimating polynomial calculating portion 5 calculates the estimating polynomial by combining the equation for the function surface and the homothetic conversion equations (Step S102 in FIG. 4). Specifically, the estimating polynomial calculating portion 5 substitutes the homothetic conversion equations and the factors of the homothetic conversion equations into the equation for the function surface to calculate the following estimating polynomial:

$$Y=\{4.00(0.80X-0.80)^3-7.92(0.80X-0.80)^2+10.8(0.80X-0.80)+0.22-(-15.56)\}/0.97 = 2.11X^3 - 11.55X^2+25.65X+0.02 \quad (9)$$

The operation of the estimating polynomial generating device is completed in this way. The present form of embodiment, described above, enables the calculation of an estimating polynomial so as to enable a decrease in the probability of the calculation of an unrealistic estimated value in a region wherein the analysis data are scarce through specifying in advance an equation, for a function surface that limits the relationship between the input parameter and the output parameter after a homothetic conversion so that the estimating polynomial obtained from the analysis data, the equation for the function surface, and the homothetic conversion equation will be limited by the function surface.

Figure 5:
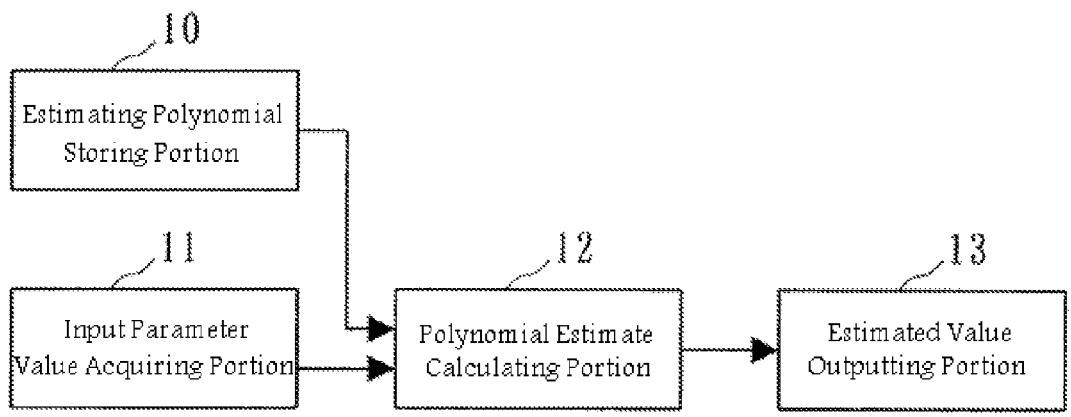
FIG. 5 is a block diagram illustrating a structure of an estimating device according to another example.

Another example of the present invention is explained next. FIG. 5 is a block diagram illustrating a configuration of an estimating device according to a second form of embodiment according to the present invention. The estimating device of FIG. 5 is used, in the on-line stage, for calculating estimated values using an estimating polynomial that is calculated by the estimating polynomial generating device above, and has an estimating polynomial storing portion 10, an input parameter value acquiring portion 11, a polynomial estimate calculating portion 12, and an estimated value outputting portion 13. Note that the estimating device has an estimating polynomial generating device incorporated therein.

Figure 6:
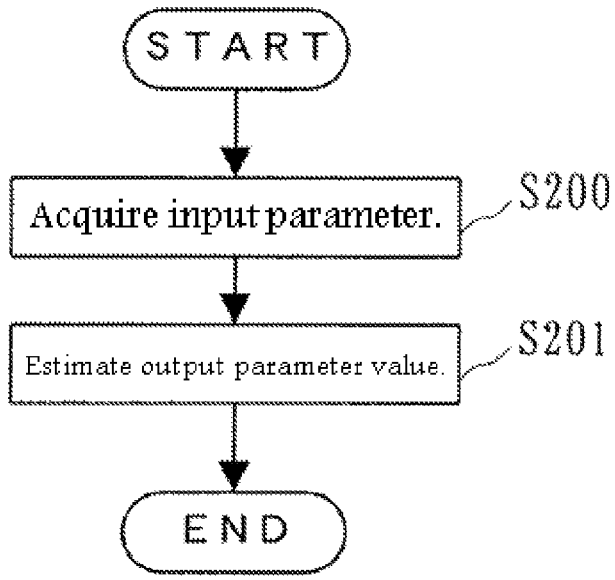
FIG. 6 is a flowchart illustrating the operation of the estimating device according to the present invention.

FIG. 6 is a flowchart illustrating the operation of the estimating device according to the present example. The estimating polynomial storing portion 10 stores an estimating polynomial calculated in advance by the estimating polynomial calculating portion 5 explained above. The input parameter value acquiring portion 11 acquires an input parameter value, such as a temperature that is inputted from a temperature sensor (not shown) during the execution of a process such as, for example, a thermal process or a plasma process in a semiconductor manufacturing device (Step S200 in FIG. 6).

The polynomial estimate calculating portion 12 uses the estimating polynomial stored in the estimating polynomial storing portion 10 to estimate an output parameter value from an input parameter value acquired by the input parameter value acquiring portion 11 (Step S201). The output parameter value estimated by the polynomial estimate calculating portion 12 is outputted to the outside through the estimated value outputting portion 13. The polynomial estimate calculating portion 12 performs this type of the estimating process at, for example, regular time intervals. In this way, the present form of embodiment enables the estimation of an output parameter value, such as a state quantity, using the estimating polynomial that is calculated by the estimating polynomial generating portion above.

Figure 7:
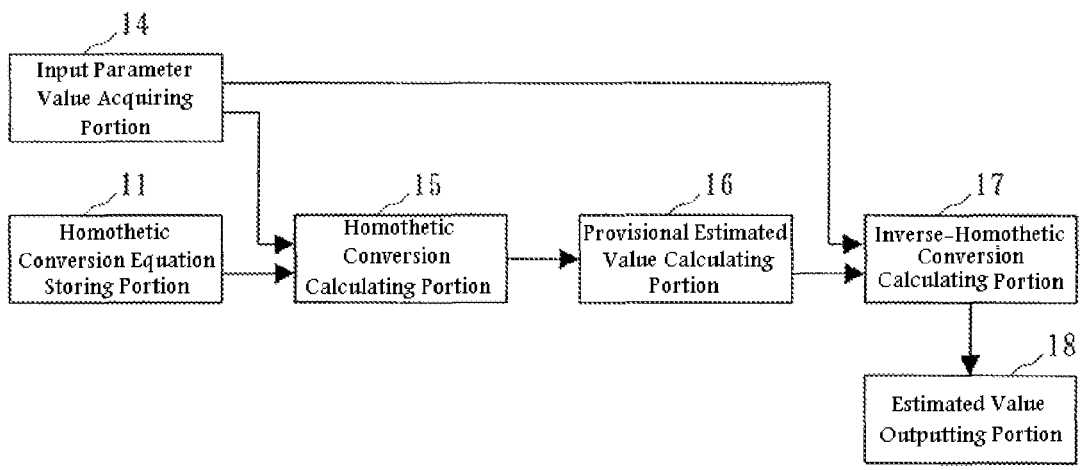
FIG. 7 is a block diagram illustrating a structure of an estimating device according to a further example.

A further example of the present invention is explained next. FIG. 7 is a block diagram illustrating a configuration for an estimating device according to the present invention. The estimating device of FIG. 7 is used in the online stage for calculating an estimated value using the homothetic conversion equations established by the estimating polynomial generating device according to the example above, and includes an input parameter value acquiring portion 11, a homothetic conversion equation storing portion 14, a homothetic conversion calculating portion 15, a provisional estimated value calculating portion 16, an inverse homothetic conversion calculating portion 17, and an estimated value outputting portion 18. As with the above, the estimating device may incorporate an estimating polynomial generating device therein. However, in the case of the present example, the estimating polynomial equation calculating portion 5 of the estimating polynomial generating device is not necessary.

Figure 8:
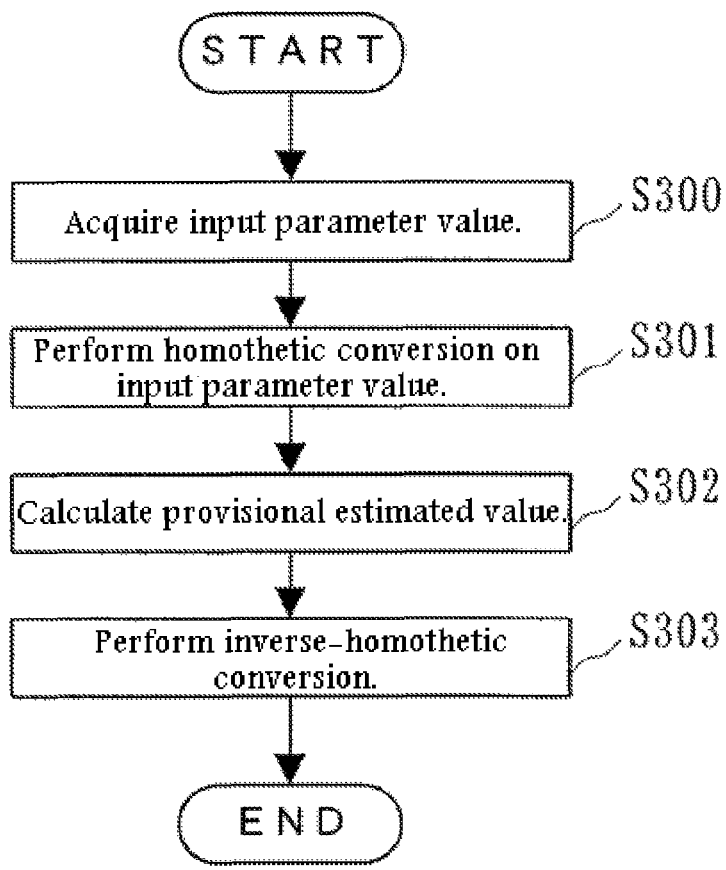
FIG. 8 is a flowchart illustrating the operation of the estimating device according to the present invention.

FIG. 8 is a flowchart illustrating the operation of the estimating device. The homothetic conversion equation storing portion 14 stores the homothetic conversion equations having the factors established by the homothetic conversion parameter searching portion 4 of the estimating polynomial generating device. According to the example, the homothetic conversion equations wherein the factors have been established are as in Equation (5) and Equation (6). As with the other example, the input parameter value acquiring portion 11 acquires an input parameter value X (Step S300 in FIG. 8).

The homothetic conversion calculating portion 15 uses the homothetic conversion equation of Equation (5), stored in the homothetic conversion equation storing portion 14, to calculate the parameter value x wherein the input parameter value X has been subjected to the homothetic conversion (Step S301). The provisional estimated value calculating portion 16 uses the function surface that is stored in the function surface storing portion 2 of the estimating polynomial generating device (Equation (2) in the example in the above example) to calculate a parameter value y from the parameter value x and that has undergone the homothetic conversion by the homothetic conversion calculating portion 15, where this parameter value y is a provisional estimated value (Step S302).

The inverse-homothetic conversion calculating portion 17 calculates the output parameter Y from the provisional estimated value y, which was calculated by the provisional estimated value calculating portion 16, through an inverse calculation of the homothetic conversion equation of Equation (6), which is stored in the homothetic conversion equation storing portion 14 (Step S303). The inverse calculation equation for the homothetic conversion equation of Equation (6) is as follows:

$$Y=(y+15.56)/0.97 \tag{10}$$

In this way, the present example enables the estimation of an output parameter value, such as a state quantity, using the homothetic conversion equations established by the estimating polynomial generating device of the above example.

Figure 9:
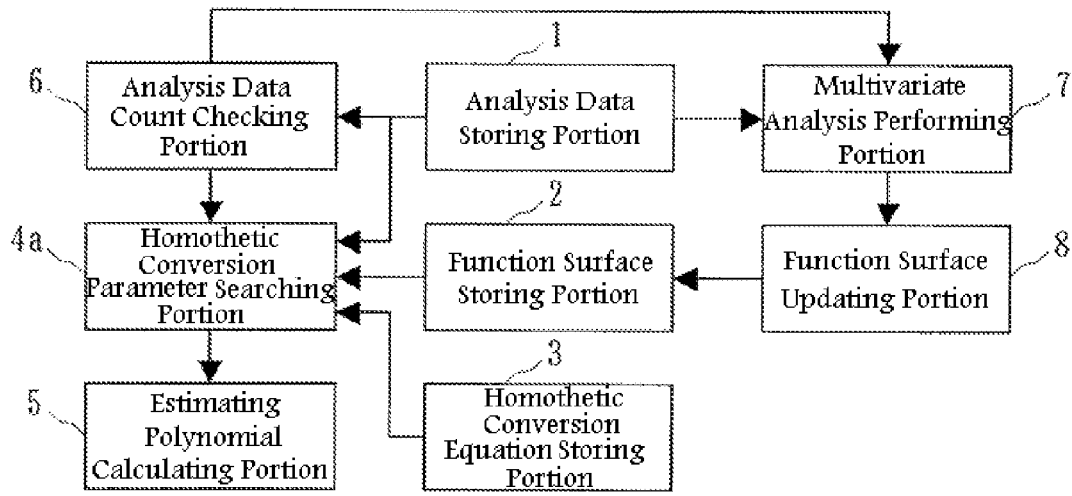
FIG. 9 is a block diagram illustrating a structure for an estimating polynomial generating device according to yet another example.

FIG. 9 is a block diagram illustrating a configuration for an estimating polynomial generating device according to the present invention. The estimating polynomial generating device of FIG. 9 has an analysis data storing portion 1, a function surface storing portion 2, a homothetic conversion equation storing portion 3, a homothetic conversion parameter searching portion 4a, an estimating polynomial calculating portion 5, an analysis data count checking portion 6, a multivariate analysis performing portion 7, and a function surface updating portion 8. The present form of embodiment corresponds to the other principle of the present invention, described above.

Figure 10:
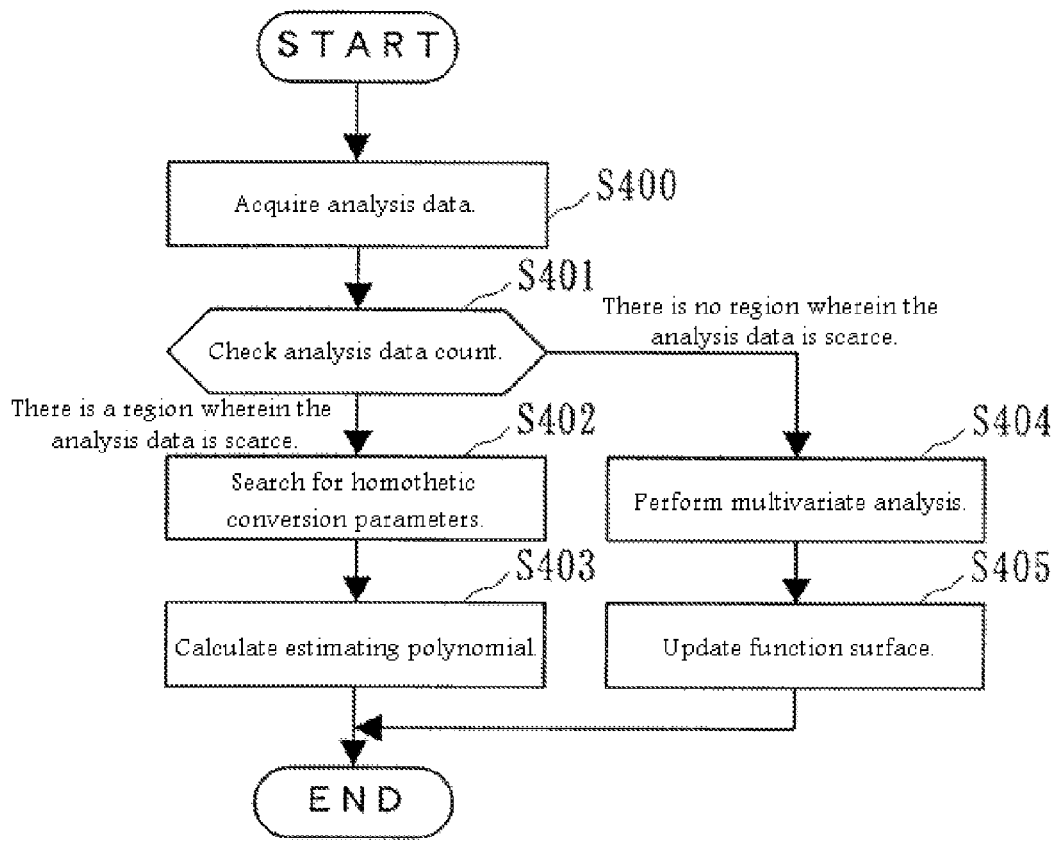
FIG. 10 is a flowchart illustrating the operation of the estimating polynomial generating device according to the present invention.

FIG. 10 is a flowchart illustrating the operation of the estimating polynomial generating device according to the present example. The analysis data storing portion 1, the function surface storing portion 2, and the homothetic converting equation storing portion 3 are as explained above. The analysis data count checking portion 6 obtains the analysis data from the analysis data storing portion 1 (Step S400 in FIG. 10). In the analysis data count checking portion 6, the division of the input parameter space into an appropriate number of sub-regions is specified in advance. For example, for a single input parameter, the input parameter space may be, for example, divided into sub-regions by dividing the range that can be assumed by the input values into two or three intervals. In the example in FIG. 12, it is divided into $0.0 \leq X < 2.0$ and $2.0 \leq X \leq 4.0$.

Figure 11:
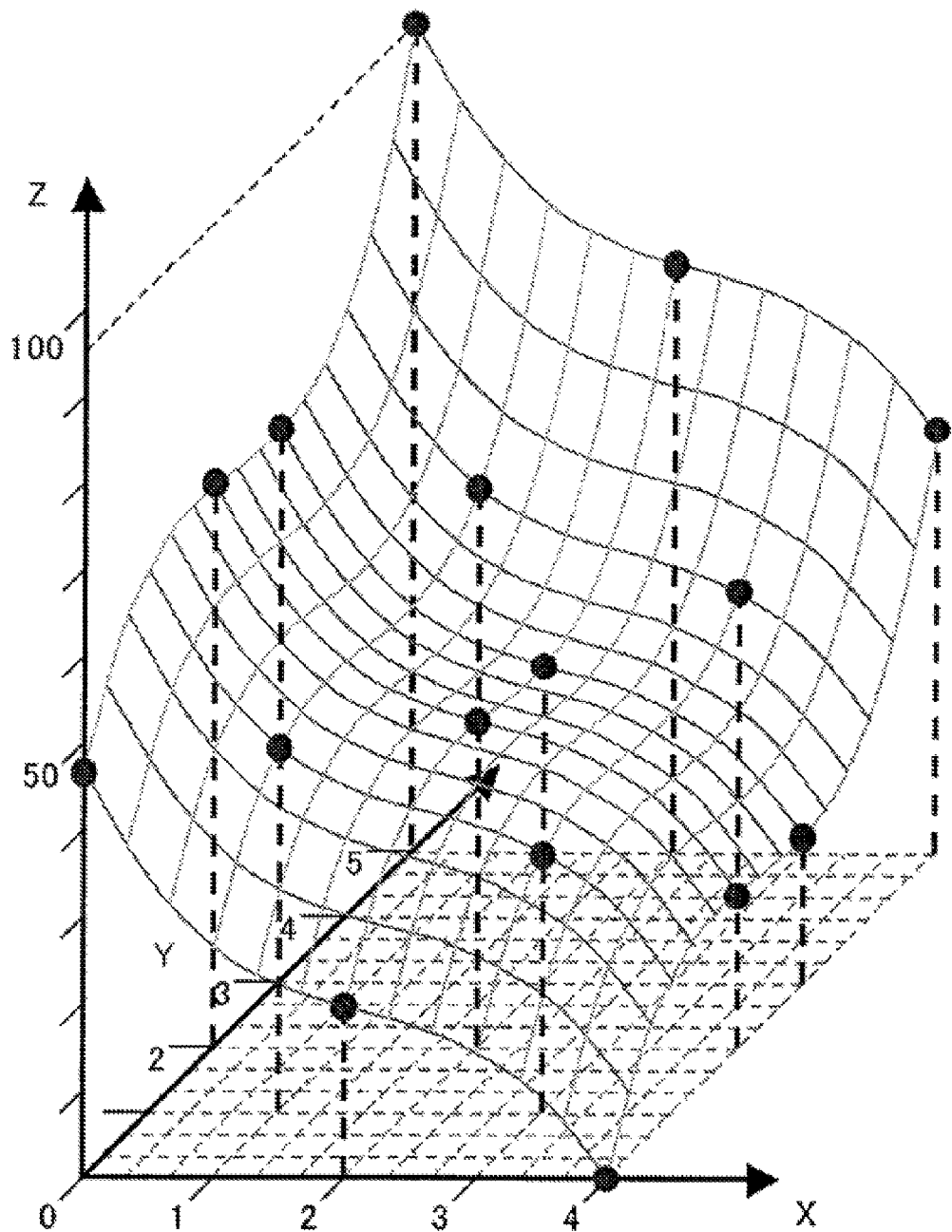
FIG. 11 is a diagram illustrating one example of a distribution of analysis data in a case wherein there are two input parameters.

In the case of there being two input parameters, X and Y, such as in FIG. 11, then the division is into four sub-regions (where each input parameter is divided into two segments each): $\{0.0 \leq X < 2.0, 0.0 \leq Y < 2.5\}$, $\{0.0 \leq X < 2.0, 2.5 \leq Y < 5.0\}$, $\{2.0 \leq X < 4.0, 0.0 \leq Y < 2.5\}$, and $\{2.0 \leq X < 4.0, 2.5 \leq Y < 5.0\}$. If there are three or more input parameters, then the division may be through this same method.

Given this, the analysis data count checking portion 6 evaluates, for each sub-region and for each input parameter, whether or not there is a region wherein the analysis data are scarce (Step S401 in FIG. 10). Specifically, the analysis data count checking portion 6 evaluates, for each input parameter, whether or not there are at least n (where, for example, n=2) analysis data in at least the proportion of the sub-ranges that is specified in advance. The "at least the proportion . . . that is specified in advance" means that the proportion that is the number of sub-regions wherein there are at least n analysis data, relative to the total number of sub-ranges for the input parameters, is equal to or greater than the specified value. In the example in FIG. 11, the number of sub-ranges for the input parameter X is two, and thus if the number of sub-regions wherein there are at least n analysis data is 1, then the proportion would be 0.5. In the case of the two input parameters X and Y, then this type of evaluation is performed for both X and Y.

If, for all of the input parameters, there are at least n analysis data in sub-regions of at least the proportion that is specified in advance, then the analysis data count checking portion 6 evaluates that there is no region wherein the analysis data are scarce, but if there is even one input parameter for which the proportion of sub-regions wherein there is at least n analysis data is less than the specified value, then the analysis data count checking portion 6 determines that there is a region wherein the analysis data are scarce. In the example in FIG. 12, the number of data in the sub-region of $0.0 \leq X < 2.0$ is low, and thus the evaluation is that there is a region wherein the analysis data are scarce.

Note that, conversely, the evaluation may be that there is no region wherein the analysis data are scarce if there are at least n analysis data in every one of the sub-regions, and the evaluation may be that there is a region wherein the analysis data are scarce if there are less than n analysis data in even one of the sub-regions.

If the evaluation is that there is a region wherein the analysis data are scarce, then the homothetic conversion parameter searching portion 4a searches for the factors for the homothetic conversion equations (Step S402 in FIG. 10). The operation of the homothetic conversion parameter searching portion 4a is identical to that of the homothetic conversion parameter searching portion 4 in the other example. The estimating polynomial calculating portion 5 then calculates the estimating polynomial in the same manner as above (Step S403).

On the other hand, if the evaluation is that there is no region wherein the analysis data are scarce, then the multivariate analysis performing portion 7 performs a multivariate analysis such as a multiple regression analysis or an SVR on the analysis data that is stored in the analysis data storing portion 1, to calculate the estimating polynomial for estimating an output parameter from an input parameter (Step S404). The function surface updating portion 8 updates the equation for the function surface, stored in the function surface storing portion 2, as the equation for a function surface with the new estimating polynomial calculated by the multivariate analysis performing portion 7 (Step S405). If an estimating polynomial is obtained as in Equation (7), then the equation for the function surface will be as in the following equation:

$$y=2.11x^3-11.55x^2+25.65x+0.02 \tag{11}$$

As described above, in the present example, an evaluation is performed as to whether or not there is a region wherein the analysis data are scarce, and if the evaluation is that there is a region wherein the analysis data are scarce, then the estimating polynomial is calculated using the method above, but if the evaluation is that there is no region wherein the analysis data are scarce, then the estimating polynomial is calculated through ordinary multivariate analysis, thus enabling the appropriate calculation of the estimating polynomial in accordance with the scarcity or density of the analysis data, and enabling the equation for the function surface to be updated appropriately using the estimating polynomial that is calculated when the analysis data is dense. Note that the present example, of course, be combined with the other example.

The individual estimating polynomial generating devices and estimating devices explained in the above example may each be embodied in a computer having a CPU, a memory device, and an interface, and a program for controlling these hardware resources. A CPU of an estimating polynomial generating device and an estimating device performs the processes, explained in the example in accordance with a program that is stored in a storing device.

The present invention can be applied to technologies for estimating state quantities, and the like, through the use of estimating polynomials.

The invention claimed is:

1. An estimating polynomial generating device comprising:
   an analysis data storer storing in advance analysis data comprising input parameter data and corresponding output parameter data;
   a function surface storer storing in advance an equation for a function surface for limiting a relationship between the input parameter and the corresponding output parameter after a homothetic conversion;
   a homothetic conversion equation storer storing in advance a homothetic conversion equation for performing homothetic conversion of the input parameter and the corresponding output parameter;
   a homothetic conversion parameter searcher searching and establishing factors of the homothetic conversion equation using the analysis data, the equation for the function surface, and the homothetic conversion equation; and
   an estimating polynomial calculator calculating an estimating polynomial for estimating an output parameter value from an input parameter value by combining the function surface equation and the homothetic conversion equation for which the factors have been established, wherein
   the homothetic conversion parameter searcher uses a searching equation wherein the homothetic conversion equations are substituted into the equation for the function surface to search for the factors in the homothetic conversion equations that minimize a sum of errors each obtained for each of the analysis data by calculating, for each of the analysis data, the error in the output parameter calculated by substituting the analysis data into the searching equation.

2. An estimating polynomial generating device comprising:
   an analysis data storer storing in advance analysis data comprising input parameter data and corresponding output parameter data;
   a function surface storer storing in advance an equation for a function surface for limiting a relationship between the input parameter and the corresponding output parameter after a homothetic conversion;
   a homothetic conversion equation storer storing in advance a homothetic conversion equation for performing homothetic conversion of the input parameter and the corresponding output parameter;
   an analysis data count checker evaluating whether or not there is a region wherein the analysis data are scarce;
   a homothetic conversion parameter searcher searching and establishing factors of the homothetic conversion equation using the analysis data, the equation for the function surface, and the homothetic conversion equation when there is an evaluation that there is a region wherein the analysis data are scarce;
   an estimating polynomial calculator calculating an estimating polynomial for estimating an output parameter value from an input parameter value by combining the function surface equation and the homothetic conversion equation for which the factors have been established, when there is an evaluation that there is a region wherein the analysis data are scarce;
   a multivariate analysis performing device calculating an estimating polynomial for estimating an output parameter value from an input parameter value through multivariate analysis on the analysis data when there is an evaluation that there is no region wherein the analysis data are scarce; and
   a function surface updater updating the equation for the function surface, stored in the function surface storing unit, as an equation for a function surface with a new estimating polynomial calculated by the multivariate analysis performing device, wherein
   the analysis data count checker divides input parameter space into a plurality of sub-regions, and, if there are analysis data of at least a specified count in all of the sub-regions or in sub-regions of at least a proportion that is set in advance, evaluates that there are no regions wherein the analysis data are scarce.

3. An estimating device comprising:
   an estimating polynomial generating device having
      an analysis data storer storing in advance analysis data including input parameter data and corresponding output parameter data,
      a function surface storer storing in advance an equation for a function surface for limiting a relationship between the input parameter and the corresponding output parameter after a homothetic conversion,
      a homothetic conversion equation storer storing in advance a homothetic conversion equation for performing homothetic conversion of the input parameter and the corresponding output parameter,
      a homothetic conversion parameter searcher searching and establishing factors of the homothetic conversion equation using the analysis data, the equation for the function surface, and the homothetic conversion equation, and
      an estimating polynomial calculator calculating an estimating polynomial for estimating an output parameter value from an input parameter value by combining the function surface equation and the homothetic conversion equation for which the factors have been established;
   an input parameter value acquirer acquiring an input parameter value; and
   a polynomial estimate calculator estimating an output parameter from an input parameter, acquired by the input parameter value acquirer, using an estimating polynomial calculated by the estimating polynomial calculator, wherein
   the homothetic conversion parameter searcher uses a searching equation wherein the homothetic conversion equations are substituted into the equation for the function surface to search for the factors in the homothetic conversion equations that minimize a sum of errors each obtained for each of the analysis data by calculating, for each of the analysis data, the error in the output parameter calculated by substituting the analysis data into the searching equation.

4. An estimating device comprising:
   an estimating polynomial generating device having
      an analysis data storer storing in advance analysis data including input parameter data and corresponding output parameter data,
      a function surface storer storing in advance an equation for a function surface for limiting a relationship between the input parameter and the corresponding output parameter after a homothetic conversion,
      a homothetic conversion equation storer storing in advance a homothetic conversion equation for performing homothetic conversion of the input parameter and the corresponding output parameter, an analysis data count checker evaluating whether or not there is a region wherein the analysis data are scarce, a homothetic conversion parameter searcher searching and establishing factors of the homothetic conversion equation using the analysis data, the equation for the function surface, and the homothetic conversion equation when there is an evaluation that there is a region wherein the analysis data are scarce, an estimating polynomial calculator calculating an estimating polynomial for estimating an output parameter value from an input parameter value by combining the function surface equation and the homothetic conversion equation for which the factors have been established, when there is an evaluation that there is a region wherein the analysis data are scarce, a multivariate analysis performing device calculating an estimating polynomial for estimating an output parameter value from an input parameter value through multivariate analysis on the analysis data when there is an evaluation that there is no region wherein the analysis data are scarce, and a function surface updater updating the equation for the function surface, stored in the function surface storing unit, as an equation for a function surface with a new estimating polynomial calculated by the multivariate analysis performing device;

an input parameter value acquirer acquiring an input parameter value; and a polynomial estimate calculator estimating an output parameter from an input parameter, acquired by the input parameter value acquirer, using an estimating polynomial calculated by the estimating polynomial calculator, wherein the analysis data count checker divides input parameter space into a plurality of sub-regions, and, if there are analysis data of at least a specified count in all of the sub-regions or in sub-regions of at least a proportion that is set in advance, evaluates that there are no regions wherein the analysis data are scarce.

5. An estimating device comprising:

an estimating polynomial generating device having an analysis data storer storing in advance analysis data including input parameter data and corresponding output parameter data, a function surface storer storing in advance an equation for a function surface for limiting a relationship between the input parameter and the corresponding output parameter after homothetic conversion, a homothetic conversion equation storer storing in advance a homothetic conversion equation for performing the homothetic conversion of the input parameter and the corresponding output parameter, a homothetic conversion parameter searcher searching and establishing factors of the homothetic conversion equation using the analysis data, the equation for the function surface, and the homothetic conversion equation, and an estimating polynomial calculator calculating an estimating polynomial for estimating an output parameter value from an input parameter value by combining the function surface equation and the homothetic conversion equation for which the factors have been established;

an input parameter value acquirer acquiring an input parameter value;

a homothetic conversion calculator calculating a parameter value wherein there has been a homothetic conversion of an input parameter value acquired by the input parameter value acquirer, using the homothetic conversion equation wherein the factors are established by the homothetic conversion parameter searcher;

a provisional estimated value calculator estimating a provisional output parameter value homothetically converted from an input parameter value homothetically converted by the homothetic conversion calculator, using the equation for the function surface stored in the function surface storer; and an inverse-homothetic conversion calculator calculating a final output parameter value from the provisional output parameter value calculated by the provisional estimated value calculator, through an inverse calculation of the homothetic conversion equation having the factors established by the homothetic conversion parameter searcher.

6. An estimating polynomial generating method, comprising:

an analysis data storing step of storing in an analysis data storer in advance analysis data including input parameter data and corresponding output parameter data;

a function surface storing step of storing in a function surface storer in advance an equation for a function surface for limiting a relationship between the input parameter and the corresponding output parameter after a homothetic conversion;

a homothetic conversion equation storing step of storing in a homothetic conversion equation storer in advance a homothetic conversion equation for performing homothetic conversion of the input parameter and the corresponding output parameter;

a homothetic conversion parameter searching step of acquiring, by a homothetic conversion parameter searcher, the analysis data from the analysis data storer, the equation for the function surface from the function surface storer and the homothetic conversion equation from the homothetic conversion equation storer, and searching for and establishing, by the homothetic conversion parameter searcher, factors for the homothetic conversion equation; and an estimating polynomial calculating step of calculating, by an estimating polynomial calculator, an estimating polynomial for estimating an output parameter value from an input parameter value by combining the function surface equation and the homothetic conversion equation for which the factors have been established, wherein, in the homothetic conversion parameter searching step, the homothetic conversion parameter searcher uses a searching equation wherein the homothetic conversion equations are substituted into the equation for the function surface to search for factors in the homothetic conversion equations that minimize a sum of errors each obtained for each of the analysis data by calculating, for each of the analysis data, the error in the output parameter calculated by substituting the analysis data into the searching equation.

7. An estimating polynomial generating method, comprising:

an analysis data storing step of storing in an analysis data storer in advance analysis data including input parameter data and corresponding output parameter data;

a function surface storing step of storing in a function surface storer in advance an equation for a function surface for limiting a relationship between the input parameter and the corresponding output parameter after a homothetic conversion;

a homothetic conversion equation storing step of storing in a homothetic conversion equation storer in advance a homothetic conversion equation for performing homothetic conversion of the input parameter and the corresponding output parameter;

an analysis data count checking step of acquiring, by an analysis data count checker, the analysis data from the analysis data storer, and evaluating, by the analysis data count checker, whether or not there is a region wherein the analysis data are scarce;

a homothetic conversion parameter searching step of acquiring, by a homothetic conversion parameter searcher, the analysis data from the analysis data storer store, the equation for the function surface from the function surface storer, and the homothetically conversion equation from the homothetic conversion equation storer, and searching for and establishing, by the homothetic conversion parameter searcher, factors for the homothetic conversion equation, when it has been evaluated that there is a region wherein the analysis data are scarce;

an estimating polynomial calculating step of calculating, by an estimating polynomial calculator, an estimating polynomial for estimating an output parameter value from an input parameter value by combining the function surface equation and the homothetic conversion equation for which the factors have been established, when there is an evaluation that there is a region wherein the analysis data are scarce;

a multivariate analysis performing step of calculating, by a multivariate analysis performing device, an estimating polynomial for estimating an output parameter value from an input parameter value through multivariate analysis on the analysis data when there is an evaluation that there is no region wherein the analysis data are scarce; and a function surface updating step of updating, by a function surface updater, the equation for the function surface, stored in the function surface storer, as an equation for a function surface with a new estimating polynomial calculated by the multivariate analysis performing step, wherein in the analysis data count checking step, the analysis data count checker divides input parameter space into a plurality of sub-regions, and, if there are analysis data of at least a specified count in all of the sub-regions or in sub-regions of at least a proportion that is set in advance, evaluates that there are no regions wherein the analysis data are scarce.

8. An estimating method comprising:

an analysis data storing step of storing in an analysis data storer in advance analysis data including input parameter data and corresponding output parameter data;

a function surface storing step of storing in a function surface storer in advance an equation for a function surface for limiting a relationship between the input parameter and the corresponding output parameter after a homothetic conversion;

a homothetic conversion equation storing step of storing in a homothetic conversion equation storer in advance a homothetic conversion equation for performing homothetic conversion of the input parameter and the corresponding output parameter;

a homothetic conversion parameter searching step of acquiring, by a homothetic conversion parameter searcher, the analysis data from the analysis data storer, the equation for the function surface from the function surface storer, and the homothetic conversion equation from the homothetic conversion equation storer, and searching for and establishing, by the homothetic conversion parameter searcher, factors for the homothetic conversion equation;

an estimating polynomial calculating step of calculating, by an estimating polynomial calculator, an estimating polynomial for estimating an output parameter value from an input parameter value by combining the function surface equation and the homothetic conversion equation for which the factors have been established;

an input parameter value acquiring step of acquiring an input parameter value by input parameter value acquirer; and a polynomial estimate calculating step of estimating, by a polynomial estimate calculator, an output parameter from an input parameter, acquired by the input parameter value acquiring step, using an estimating polynomial calculated by the estimating polynomial calculating step, wherein, in the homothetic conversion parameter searching step, the homothetic conversion parameter searcher uses a searching equation wherein the homothetic conversion equations are substituted into the equation for the function surface to search for the factors in the homothetic conversion equations that minimize a sum of errors each obtained for each of the analysis data by calculating, for each of the analysis data, the error in the output parameter calculated by substituting the analysis data into the searching equation.

9. An estimating method, comprising:

an analysis data storing step of storing in an analysis data storer in advance analysis data including input parameter data and corresponding output parameter data;

a function surface storing step of storing in a function surface storer in advance an equation for a function surface for limiting a relationship between the input parameter and the corresponding output parameter after a homothetic conversion;

a homothetic conversion equation storing step of storing in a homothetic conversion equation storer in advance a homothetic conversion equation for performing homothetic conversion of the input parameter and the corresponding output parameter;

an analysis data count checking step of acquiring, by an analysis data count checker, the analysis data from the analysis data storer, and evaluating, by the analysis data count checker, whether or not there is a region wherein the analysis data are scarce;

a homothetic conversion parameter searching step of acquiring, by a homothetic conversion parameter searcher, the analysis data from the analysis data storer store, the equation for the function surface from the function surface storer, and the homothetically conversion equation from the homothetic conversion equation storer, and searching for and establishing, by the homothetic conversion parameter searcher, factors for the homothetic conversion equation, when it has been evaluated that there is a region wherein the analysis data are scarce;

an estimating polynomial calculating step of calculating, by an estimating polynomial calculator, an estimating polynomial for estimating an output parameter value from an input parameter value by combining the function surface equation and the homothetic conversion equation for which the factors have been established, when there is an evaluation that there is a region wherein the analysis data are scarce;

a multivariate analysis performing step of calculating, by a multivariate analysis performing device, an estimating polynomial for estimating an output parameter value from an input parameter value through multivariate analysis on the analysis data when there is an evaluation that there is no region wherein the analysis data are scarce;

a function surface updating step of updating, by a function surface updater, the equation for the function surface, stored in the function surface storer, as an equation for a function surface with a new estimating polynomial calculated by the multivariate analysis performing step;

an input parameter value acquiring step of acquiring an input parameter value, by input parameter value acquirer; and a polynomial estimate calculating step of estimating, by a polynomial estimate calculator, an output parameter from an input parameter, acquired by the input parameter value acquiring step, using an estimating polynomial calculated by either the estimating polynomial calculating step or the multivariate analysis performing step, wherein in the analysis data count checking step, the analysis data count checker divides input parameter space into a plurality of sub-regions, and, if there are analysis data of at least a specified count in all of the sub-regions or in sub-regions of at least a proportion that is set in advance, evaluates that there are no regions wherein the analysis data are scarce.

10. An estimating method, comprising:

an analysis data storing step of storing in an analysis data storer in advance analysis data including input parameter data and corresponding output parameter data;

a function surface storing step of storing in a function surface storer in advance an equation for a function surface for limiting a relationship between the input parameter and the corresponding output parameter after a homothetic conversion;

a homothetic conversion equation storing step of storing in a homothetic conversion equation storer in advance a homothetic conversion equation for performing homothetic conversion of the input parameter and the corresponding output parameter;

a homothetic conversion parameter searching step of acquiring, by a homothetic conversion parameter searcher, the analysis data from the analysis data storer, the equation for the function surface from the function surface storer, and the homothetic conversion equation from the homothetic conversion equation storer, and searching for and establishing, by the homothetic conversion parameter searcher, factors for the homothetic conversion equation; and an estimating polynomial calculating step of calculating, by an estimating polynomial calculator, an estimating polynomial for estimating an output parameter value from an input parameter value by combining the function surface equation and the homothetic conversion equation for which the factors have been established;

an input parameter value acquiring step of acquiring an input parameter value;

a homothetic conversion calculating step of calculating, by a homothetic conversion calculator, a parameter value wherein there has been a homothetic conversion of an input parameter value acquired by the input parameter value acquiring step, using the homothetic conversion equation wherein the factors are established by the homothetic conversion parameter searching step;

a provisional estimated value calculating step of estimating, by a provisional estimated value calculator, a provisional output parameter value homothetically converted from an input parameter value homothetically converted by the homothetic conversion calculating step, using the equation for the function surface stored in the function surface storing step; and an inverse-homothetic conversion calculating step of calculating, by an inverse-homothetic conversion calculator, a final output parameter value from the provisional output parameter value calculated by the provisional estimated value calculating step, through an inverse calculation of the homothetic conversion equation having the factors established by a homothetic conversion parameter searching step.

\* \* \* \* \*